(12) United States Patent
Chengalvarayan

(10) Patent No.: US 7,983,916 B2
(45) Date of Patent: Jul. 19, 2011

(54) SAMPLING RATE INDEPENDENT SPEECH RECOGNITION

(75) Inventor: Rathinavelu Chengalvarayan, Naperville, IL (US)

(73) Assignee: General Motors LLC, Detroit, MI (US)

( * ) Notice: Subject to any disclaimer, the term of this patent is extended or adjusted under 35 U.S.C. 154(b) by 1049 days.

(21) Appl. No.: 11/772,992

(22) Filed: Jul. 3, 2007

(65) Prior Publication Data

US 2009/0012785 A1 Jan. 8, 2009

(51) Int. Cl.
*G10L 15/02* (2006.01)
*G10L 15/06* (2006.01)

(52) U.S. Cl. ......... 704/255; 704/205; 704/221; 704/243

(58) Field of Classification Search .......... 704/205, 704/206, 211, 221, 231, 233, 243, 255
See application file for complete search history.

(56) References Cited

U.S. PATENT DOCUMENTS

| | | | | |
|---|---|---|---|---|
| 5,970,446 A * | 10/1999 | Goldberg et al. | ............ | 704/233 |
| 6,070,136 A * | 5/2000 | Cong et al. | ............ | 704/222 |
| 6,199,041 B1 * | 3/2001 | Liu et al. | ............ | 704/231 |
| 6,721,698 B1 * | 4/2004 | Hariharan et al. | ............ | 704/203 |
| 6,804,643 B1 * | 10/2004 | Kiss | ............ | 704/234 |
| 7,062,431 B2 * | 6/2006 | Hirsch et al. | ............ | 704/205 |
| 7,089,178 B2 * | 8/2006 | Garudadri et al. | ............ | 704/205 |
| 7,454,338 B2 * | 11/2008 | Seltzer et al. | ............ | 704/243 |
| 7,676,363 B2 * | 3/2010 | Chengalvarayan et al. | .. | 704/233 |
| 7,707,029 B2 * | 4/2010 | Seltzer et al. | ............ | 704/206 |
| 7,797,158 B2 * | 9/2010 | Gilbert | ............ | 704/234 |
| 2004/0138882 A1 * | 7/2004 | Miyazawa | ............ | 704/233 |
| 2005/0209852 A1 * | 9/2005 | Beckert et al. | ............ | 704/246 |
| 2006/0190254 A1 * | 8/2006 | Iser et al. | ............ | 704/243 |
| 2008/0215322 A1 * | 9/2008 | Fischer et al. | ............ | 704/243 |
| 2009/0138264 A1 * | 5/2009 | George et al. | ............ | 704/251 |

FOREIGN PATENT DOCUMENTS

WO WO/2005/083677 * 9/2005

* cited by examiner

*Primary Examiner* — Martin Lerner
(74) *Attorney, Agent, or Firm* — Anthony L. Simon; Reising Ethington P.C.

(57) ABSTRACT

A sampling-rate-independent method of automated speech recognition (ASR). Speech energies of a plurality of codebooks generated from training data created at an ASR sampling rate are compared to speech energies in a current frame of acoustic data generated from received audio created at an audio sampling rate below the ASR sampling rate. A codebook is selected from the plurality of codebooks, and has speech energies that correspond to speech energies in the current frame over a spectral range corresponding to the audio sampling rate. Speech energies above the spectral range are copied from the selected codebook and appended to the current frame.

10 Claims, 7 Drawing Sheets

| Filter-Bank Number | Center Frequency (Hz) | Lower Cutoff Frequency (Hz) | Upper Cutoff Frequency (HF) |
|---|---|---|---|
| 1 | 62.5 | 31.25 | 93.75 |
| 2 | 109.38 | 62.5 | 156.25 |
| 3 | 156.25 | 109.38 | 203.13 |
| 4 | 203.13 | 171.88 | 265.63 |
| 5 | 265.63 | 218.75 | 312.5 |
| 6 | 328.13 | 281.25 | 390.63 |
| 7 | 390.63 | 328.13 | 453.13 |
| 8 | 453.13 | 406.25 | 531.25 |
| 9 | 531.25 | 468.75 | 609.38 |
| 10 | 609.38 | 546.88 | 687.5 |
| 11 | 687.5 | 625 | 765.63 |
| 12 | 781.25 | 703.13 | 859.38 |
| 13 | 875 | 781.25 | 968.75 |
| 14 | 968.75 | 875 | 1062.5 |
| 15 | 1078.13 | 984.38 | 1171.88 |
| 16 | 1187.5 | 1078.13 | 1296.88 |
| 17 | 1312.5 | 1187.5 | 1421.88 |
| 18 | 1437.5 | 1312.5 | 1562.5 |
| 19 | 1562.5 | 1437.5 | 1703.13 |
| 20 | 1703.13 | 1578.13 | 1859.38 |
| 21 | 1859.38 | 1718.75 | 2015.63 |
| 22 | 2015.63 | 1875 | 2187.5 |
| 23 | 2187.5 | 2031.25 | 2375 |
| 24 | 2375 | 2203.13 | 2562.5 |
| 25 | 2562.5 | 2390.63 | 2765.63 |
| 26 | 2781.25 | 2578.13 | 2984.38 |
| 27 | 3000 | 2781.25 | 3218.75 |
| 28 | 3234.38 | 3000 | 3468.75 |
| 29 | 3484.38 | 3234.38 | 3734.38 |
| 30 | 3734.38 | 3484.38 | 4015.63 |
| 31 | 4015.63 | 3750 | 4312.5 |
| 32 | 4312.5 | 4031.25 | 4625 |
| 33 | 4640.63 | 4328.13 | 4968.75 |
| 34 | 4968.75 | 4640.63 | 5328.13 |
| 35 | 5328.13 | 4984.38 | 5703.13 |
| 36 | 5718.75 | 5343.75 | 6109.38 |
| 37 | 6125 | 5718.75 | 6546.88 |
| 38 | 6546.88 | 6125 | 7000 |
| 39 | 7015.63 | 6562.5 | 7484.38 |
| 40 | 7500 | 7015.63 | 8000 |

Rows 1–26: 0-4 kHz. Rows 27–40: 4-8 kHz.

*Figure 3A*

SAMPLING RATE INDEPENDENT SPEECH RECOGNITION

TECHNICAL FIELD

This invention relates to speech signal processing and, more particularly, to automated speech recognition (ASR).

BACKGROUND OF THE INVENTION

ASR technologies enable microphone-equipped computing devices to interpret speech and thereby provide an alternative to conventional human-to-computer input devices such as keyboards or keypads. A typical ASR system includes several basic elements. A microphone and an acoustic interface receive a user's utterance and digitize the utterance into acoustic data. An acoustic pre-processor parses the acoustic data into information-bearing acoustic features. A decoder uses acoustic models to decode the acoustic features into utterance hypotheses. The decoder generates a confidence value for each hypothesis to reflect the degree to which each hypothesis phonetically matches a subword of each utterance, and to select a best hypothesis for each subword.

Speech recognition performance suffers when there is a mismatch between a sampling rate of incoming speech, and a sampling rate used in creating the acoustic models. For example, telephonic audio systems typically use an 8 kHz sampling rate over a 4 kHz spectral range, and automotive ASR systems normally use a 16 kHz sampling rate over an 8 kHz spectral range. Thus, when a higher resolution 16 kHz ASR system receives lower resolution 8 kHz audio, the incoming audio will include acoustic features for a spectral range of 0 to 4 kHz, but will lack acoustic features from an upper spectral range of 4 to 8 kHz. Because the ASR acoustic models are built for an overall 0 to 8 kHz spectral range, the lack of upper range acoustic features degrades recognition performance, especially of fricative speech.

Therefore, according to current ASR implementations, different sets of acoustic models are empirically developed for different sampling rates. But this approach involves multitudes of different and unnecessarily complex acoustic models, thereby possibly delaying model development, increasing required computing memory and power, and yielding an unacceptable level of latency in recognition.

SUMMARY OF THE INVENTION

The present invention provides a method of sampling rate independent speech recognition. In accordance with one embodiment, the method includes the steps of:
  comparing speech energies of a plurality of codebooks generated from training data created at an ASR sampling rate to speech energies in a current frame of acoustic data generated from received audio created at an audio sampling rate below the ASR sampling rate;
  selecting from the plurality of codebooks, a codebook having speech energies that correspond to speech energies in the current frame over a spectral range corresponding to the audio sampling rate;
  copying from the selected codebook, speech energies above the spectral range; and
  appending the copied speech energies to the current frame.

This method increases speech recognition performance because it appends missing high frequency speech energies to low frequency audio for greater discrimination of high frequency fricative speech in the audio.

BRIEF DESCRIPTION OF THE DRAWINGS

Preferred exemplary embodiments of the invention will hereinafter be described in conjunction with the appended drawings, wherein like designations denote like elements, and wherein:

FIG. 3A is an exemplary Mel filter that can be used in conjunction with the method exemplified by FIG. 3 and using the telematics system and ASR architecture of FIGS. 1 and 2;

DETAILED DESCRIPTION OF THE PREFERRED EMBODIMENTS

Figure 1:
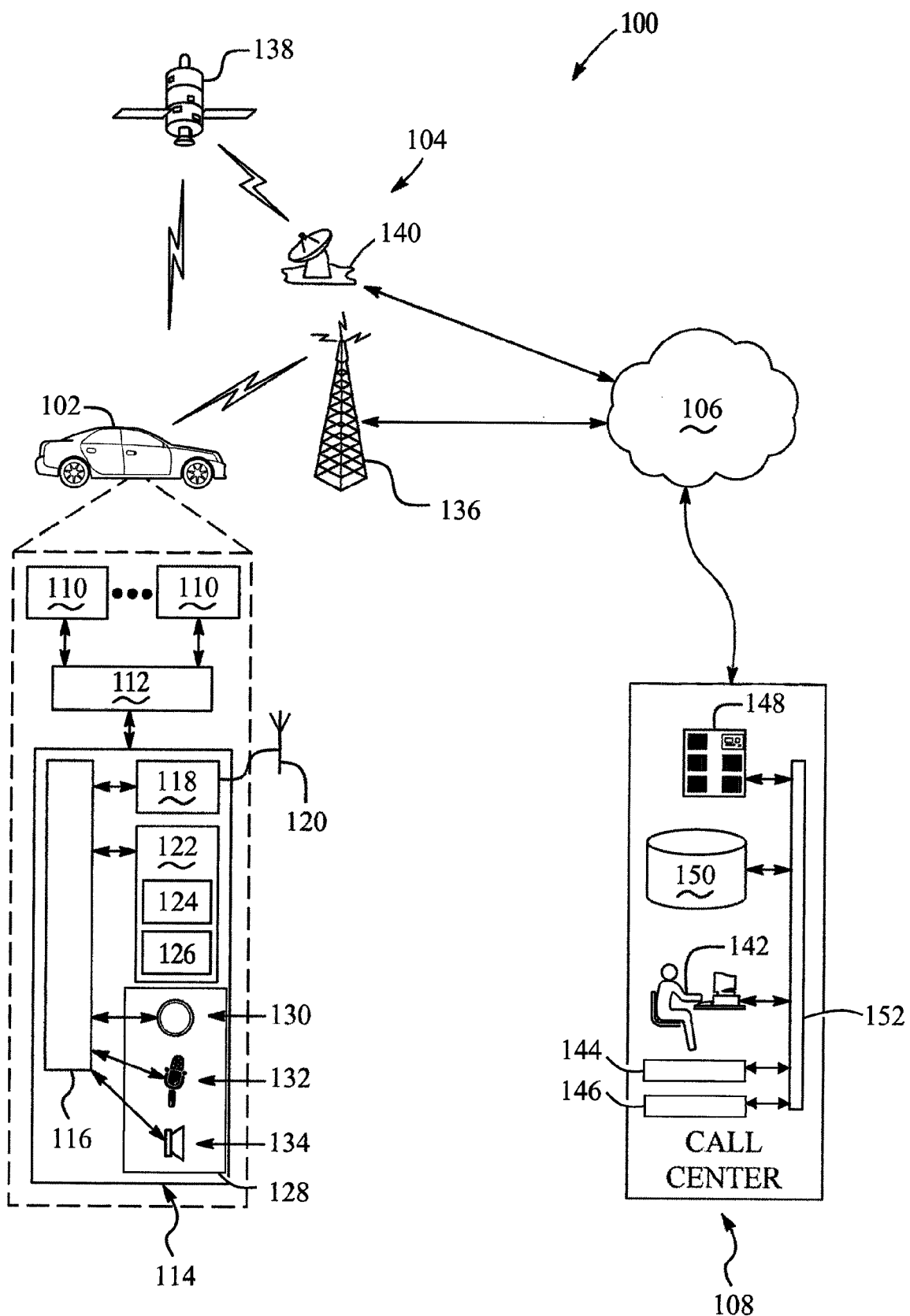
FIG. 1 is a block diagram depicting an example of a telematics system that can be used to implement exemplary methods of speech recognition.

An exemplary operating environment is illustrated in FIG. 1, and can be used to implement a presently disclosed method of sampling rate independent speech recognition. The method can be carried out using any suitable telematics system and, preferably, is carried out in conjunction with a vehicle telematics system such as system 100. Those skilled in the art will appreciate that the overall architecture, setup, operation, and individual components of the system 100 are generally known in the art. Thus, the following system description simply provides a brief overview of one such exemplary telematics system, but other systems and components not shown here could also support the presently disclosed method.

The exemplary telematics system 100 includes a vehicle 102 for carrying one or more occupants or users, and a wireless communication system 104 for providing wireless communication to and from the vehicle 102. Also, the system 100 can include a second communications system 106 for communicating the wireless communication system 104 with a call center 108 of the system 100 that provides services to the vehicle 102. Further, the system 100 can include a web server (not shown) in communication with the vehicle 102 and/or the call center 108 for providing Internet services thereto.

The system 100 can generally facilitate one or more suitable services for vehicle occupants such as vehicle navigation, turn-by-turn driving directions, infotainment, emergency services, vehicle diagnostics, vehicle system updates, and hands-free telephony and vehicle interaction using automatic speech recognition. For this purpose, the system 100 processes data and instructions as well as facilitates wireless voice and data transfer between hardware located on the vehicle 102 and hardware in the remote call center 108. For example, the system 100 enables vehicle occupants to initiate voice communication with the call center 108. Also, the system 100 enables data communication between the vehicle 102 and a web server or call center 108 for various purposes such as transmitting and/or receiving data such as voice messages, email, news, Internet content, and/or the like.

Vehicle

The vehicle 102 is depicted in the illustrated embodiment as a passenger car, and it will be appreciated that any other vehicles including motorcycles, marine vessels, aircraft, recreational vehicles, and other automobiles such as vans, trucks, or the like, can be used without departing from the scope of the invention. Various electronic modules can be located on the vehicle 102 and include one or more vehicle system modules (VSMs) 110, an on-board vehicle communication bus 112, and one or more vehicle telematics units 114 connected by the bus 112 to the VSMs 110.

The VSMs 110 facilitate any suitable on-board functions such as vehicle diagnostics, monitoring, control, reporting, and/or other functions. For example, the VSMs 110 can be used for controlling engine operation, monitoring and deploying air bags or other safety devices, and/or diagnosing vehicle systems via various vehicle sensors. The VSMs 110 broadly represent any software, electronic, or electromechanical subsystems, and related sensors or other components throughout the vehicle with which the telematics unit 114 interacts. In a specific example, if the call center 108 sends a signal to the vehicle 102 to unlock the vehicle doors, then the telematics unit 114 instructs an electromechanical door lock VSM to unlock the doors.

The vehicle communication bus 112 facilitates interactions among various vehicle systems, such as the VSMs 110 and/or the telematics unit 114, and uses any suitable network communication configuration whether wired or wireless. Suitable interfaces can be interposed between the bus 112 and the various vehicle systems. As used herein, the term interface broadly means any suitable form of electronic device or adapter, or even a software module or adapter, to enable one piece of equipment to communicate with or control another piece of equipment. A few examples of buses include a Controller Area Network (CAN), Media Oriented System Transport (MOST), Local Interconnect Network (LIN), Ethernet (10baseT, 100baseT), Local Area Network (LAN), a wireless area network (WAN), and/or any suitable International Standard Organization (ISO) or Society of Automotive Engineers (SAE) communication standards.

The vehicle telematics unit 114 facilitates communication and other services between the vehicle 102 or occupants thereof, and various remote locations including the call center 108. The telematics unit 114 interfaces with the various VSMs 110 via the vehicle communication bus 112. The telematics unit 114 can be implemented in any suitable configuration, but can include a processor 116, a communications device 118 for wireless communication to and from the vehicle 102 via one or more antennas 120, a memory 122 to store computer programs 124 and/or one or more databases 126, and a user interface 128. The telematics unit 114 also includes any suitable interface(s) for intercommunicating the aforementioned devices.

Although depicted in FIG. 1 as separate individual modules, it will be appreciated by those skilled in the art that many of the components of the telematics unit 114 can be integrated together, or integrated and/or shared with other vehicle systems. For example, the memory 122 can be incorporated into the processor 116 or located outside of telematics unit 114 and shared with one or more other vehicle systems such as a vehicle central processing unit. Although the VSMs 110 are shown separate from the telematics unit 114, it is possible for any combination of these VSMs 110 to be integrated within the telematics unit 114. Furthermore, the telematics unit 114 could include additional components not shown, or could omit some of the components shown.

The telematics processor 116 is implemented in any of various ways known to those skilled in the art such as in the form of a controller, microprocessor, microcontroller, host processor, vehicle communications processor, Application Specific Integrated Circuit (ASIC), or as any other appropriate processor type. Alternatively, the processor 116 can work in conjunction with a central processing unit (not shown) performing the function of a general purpose computer. The processor 116 can be associated with other suitable devices and/or modules (not shown) such as a real time clock device to provide accurate date and time information, and/or a timer module to track time intervals.

The processor 116 executes the one or more programs 124 stored in memory 122 to carry out various functions such as system monitoring, data processing, and communicating the telematics unit 114 with the VSMs 110, vehicle occupants, and remote locations. For example, the processor 116 can execute one or more control programs and processes programs and/or data to enable a method of sampling rate independent speech recognition, either alone or in conjunction with the call center 108. In another example, the processor 116 controls, generates, and accepts signals transmitted between the telematics unit 114 and call center 108, and between the telematics unit 114 and the vehicle communication bus 112 that is connected to the various VSMs 110. In one mode, these signals are used to activate programming and operation modes of the VSMs 110.

The telematics memory 122 can be any electronic storage device that provides computer-readable storage of data and programs for use by the processor 116. The memory 122 can include volatile, and/or non-volatile memory storage such as RAM, NVRAM, hard disks, flash memory, and/or the like, and can be implemented as one or more separate physical devices. The programs 124 include one or more computer programs that are executed as instructions by the processor 116 to carry out various functions of the telematics unit 114 such as messaging, diagnostics, communication, speech recognition, and/or the like. For example, the programs 124 resident in the memory 122 and executed by the processor 116 can be used to enable a method of sampling rate independent speech recognition. The database 126 can be used to store message data, diagnostic trouble code data or other diagnostic data, vehicle data upload (VDU) records, event activation tables, speech recognition data, and/or the like. The database 126 can be implemented as database tables that enable lookups to be performed on data stored in the database 126, and this can be done using known indexing techniques, database queries, straight serial searching through such tables, and/or any other suitable storage and lookup techniques.

The telematics communications device 118 and associated antenna 120 transmits and receives voice and data to and from the wireless communication system 104 so that the telematics unit 114 can communicate with the call center 108 such as via the second communication system 106. The communications device 118 provides such wireless communication via cellular, satellite, and/or other wireless path, and can facilitate voice and/or data communication, wherein both voice and data signals can be sent and received over a voice channel and/or vice-versa. Those skilled in the art will recognize that the communications device 118 can transmit and receive data over a voice channel by applying any suitable type of encoding or modulation to convert digital data for communication through a vocoder or speech codec incorporated in a cellular chipset. Any suitable encoding or modulation technique that provides an acceptable data rate and bit error rate can be used. The communications device 118 can include any other suitable modules as discussed below.

The communications device 118 can include a telephony module including communications software and hardware such as a wireless modem and/or a mobile telephone. The mobile telephone can be any suitable wireless telephony device such as a mobile telephone, which can be analog, digital, dual mode, dual band, multi-mode, and/or multi-band. The mobile telephone can include a separate processor and memory, and/or a standard cellular chipset. Moreover, the mobile telephone can use any suitable cellular technology such as Advanced Mobile Phone System (AMPS), code division multiple access (CDMA), time division multiple access (TDMA), Global System for Mobile communications (GSM), or the like, but could also utilize proprietary or other wireless technologies to communicate with the wireless communication system 104.

The telematics user interface 128 includes one or more input and output interfaces to receive input from, and transmit output to, telematics users. As used herein, the term user includes telematics service subscribers, vehicle occupants including drivers and passengers, and the like. Also, as used herein, the term user interface broadly means any suitable form of electronic device or adapter, or even a software module or adapter, which enables vehicle occupants to communicate with or control another piece of equipment. The user interface 128 can include individual components distributed throughout the vehicle, and/or can be integrated as a single unit such as a human/machine interface (HMI), multi-media center, or the like. Multi-media centers can receive and store downloads of content such as music, webpages, movies, television programs, videogames, or the like, for current or delayed playback.

The input interfaces can include one or more tactile devices 130, one or more microphones 132, or any other types of input technology. First, the tactile input device 130 enables vehicle occupants to activate one or more functions of the telematics unit 114, and can include one or more pushbutton switches, keypads, keyboards, or other suitable input devices located within the vehicle 102 in reach of the vehicle occupants. For example, the tactile input device 130 can be used to initiate telecommunications with remote locations such as the call center 108 or mobile telephones and/or to initiate vehicle updates, diagnostics, or the like. Second, the microphone 132 allows vehicle occupants to provide vocal input to the telematics unit 114, and enables vocal communication with various remote locations via the communications device 118. Vocal input from vehicle occupants can be interpreted using a suitable analog-to-digital interface and/or digital signal processor such as a sound card (not shown) between the microphone 132 and the processor 116, and voice and speech recognition programs and data stored within the memory 122.

The output interfaces can include one or more speakers 134, a visual display device such as a liquid crystal display, plasma screen, touch screen, heads-up display, or the like (not shown), or any other types of visual output technology. The speakers 134 enable the telematics unit 114 to communicate audible speech, signals, audio files, or the like to vehicle passengers, and can be part of a vehicle audio system or stand-alone components specifically dedicated for use with the telematics unit 114. A suitable interface such as a sound card (not shown) can be interposed between the speakers 134 and the telematics processor 116.

Communication System(s)

The communication systems 104, 106 can be implemented separately or can be combined as an integral system. Also, with suitable equipment, the call center 108 can be wirelessly communicated directly to the wireless communication system 104 without the second system 106.

The wireless communication system 104 can include one or more analog and/or digital cellular networks 136, a wireless computer network such as a wide area network (WAN), wireless local area network (WLAN), broadband wireless area (BWA) network, and/or any other suitable wireless network used to transmit voice and/or data signals between the vehicle 102 and various remote locations such as the call center 108. The exemplary cellular network 136 can be implemented as a CDMA, GSM, or other cellular communication network that enables exchange of voice and data between the vehicle 102 and the second communication system 106. The network 136 can include any suitable combination of cell towers, base stations, and/or mobile switching centers (MSC). For instance, a base station and cell tower could be co-located at the same site or they could be remotely located from one another, each base station could service a single cell tower or multiple cell towers, and various base stations could be coupled to a single MSC, to name but a few of the possible arrangements. A speech codec or vocoder can be incorporated in the system 104, such as in one or more of the base stations, but depending on the particular architecture of the wireless network, it could be incorporated within an MSC or some other network component as well.

The system 104 can also or alternatively carry out wireless communication by satellite transmission using one or more satellites 138 to communicate the vehicle 102 with the call center 108 via a ground-based satellite transceiver 140. As an exemplary implementation, the satellite transceiver 140 and satellite(s) 138 can transmit radio signals to the vehicle 102. For example, a satellite transmission can be broadcast over a spectrum in the "S" band that has been allocated by the U.S. Federal Communication Commission for national broadcasting of satellite-based Digital Audio Radio Service (DARS). More specifically, satellite transmission can be carried out using XM™ brand satellite radio services.

The second communication system 106 can be a land-based wired system such as a public switched telephone network (PTSN), Internet Protocol (IP) network, optical network, fiber network, cable network, and/or utility power transmission lines. The system 106 can also be another wireless communication system like system 104, WAN, WLAN, or a BWA network, or any combination of the aforementioned examples, any of which can be used or adapted for voice and/or data communication.

Call Center

The call center 108 provides services to the vehicle 102 by processing and storing data, and communicating with the vehicle 102. The call center 108 can provide back-end functions to the vehicle telematics unit 114 and can include one or more fixed or mobile data centers in one or more locations.

The call center 108 can include advisors 142 to monitor various vehicle conditions, respond to service requests, and provide vehicle services such as remote vehicle assistance in connection with in-vehicle safety and security systems. The advisors 142 can be implemented as live human advisors, or as automatons or computer programs responsive to user requests.

The call center 108 includes one or more voice and/or data interfaces 144 such as wired or wireless modems, switches such as private branch exchange (PBX) switches, and/or routers. The interface(s) 144 transmit and receive voice and/or data signals, such as by vehicle data uploads (VDUs), between the vehicle telematics unit 114 and the call center 108 through one or both of the communications systems 104, 106. For data-over-voice communication, the interface(s) 144 preferably apply some type of encoding or modulation to convert digital data for communication with a vocoder or speech codec.

The call center 108 can further include one or more communication service managers 146, one or more servers 148 to process data, one or more suitable databases 150 to store user data such as subscriber profiles and authentication data, and any other suitable data. The call center 108 can also include one or more wired and/or wireless networks 152 such as a LAN or WLAN, for connecting the call center components together along with the any computer(s) used by the one or more advisors 142. For example, the servers 148 and databases 150 execute and store one or more control programs and data to enable a method of sampling rate independent speech recognition, either alone or in conjunction with the telematics unit 114 of the vehicle 102. In other words, the presently disclosed method can be enabled by the telematics unit 114 of the vehicle 102, by the computing equipment and/or personnel in the call center 108, or by any combination thereof.

Exemplary ASR System

In general, a vehicle occupant vocally interacts with an automatic speech recognition system (ASR) for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

Figure 2:
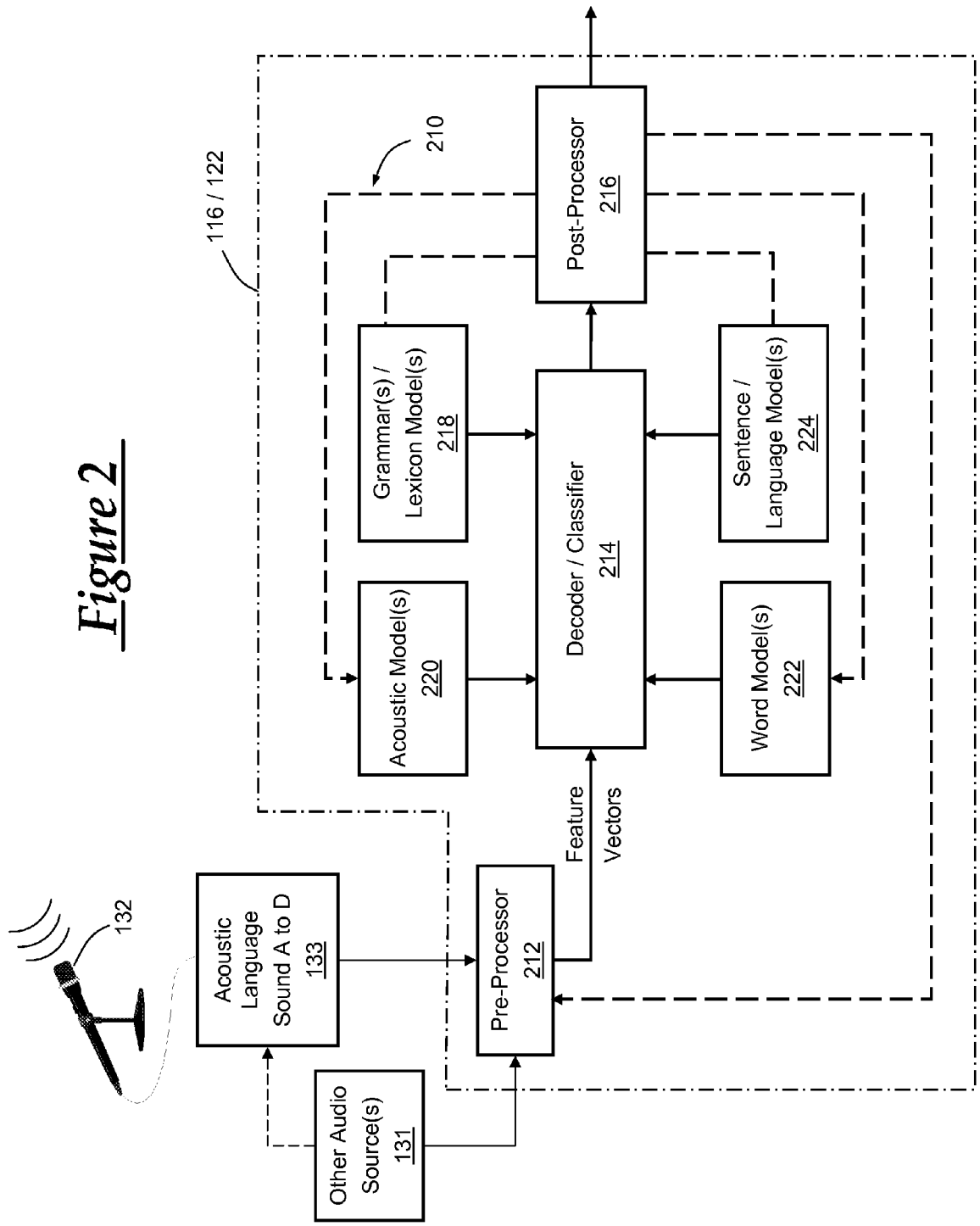
FIG. 2 is a block diagram illustrating an example ASR architecture that can be embedded within the telematics system of FIG. 1 and used to implement exemplary methods of speech recognition.

ASR systems are generally known to those skilled in the art, and FIG. 2 illustrates a specific exemplary architecture for an ASR system 210 that can be used to enable the presently disclosed method. The system 210 includes a device to receive speech such as the telematics microphone 132, and an acoustic interface 133 such as a sound card of the telematics user interface 128 to digitize the speech into acoustic data. The system 210 also includes a memory such as the telematics memory 122 for storing the acoustic data and storing speech recognition software and databases, and a processor such as the telematics processor 116 to process the acoustic data. The processor functions with the memory and in conjunction with the following modules: a front-end processor or pre-processor software module 212 for parsing streams of the acoustic data of the speech into parametric representations such as acoustic features; a decoder software module 214 for decoding the acoustic features to yield digital subword or word output data corresponding to the input speech utterances; and a post-processor software module 216 for using the output data from the decoder module 214 for any suitable purpose.

The system 210 can also receive speech from any other suitable audio source(s) 131, which can be directly communicated with the pre-processor software module 212 as shown in solid line or indirectly communicated therewith via the acoustic interface 133. The audio source(s) 131 can include, for example, a telephonic source of audio such as a voice mail system, or other telephonic services of any kind.

One or more modules or models can be used as input to the decoder module 214. First, grammar and/or lexicon model(s) 218 can provide rules governing which words can logically follow other words to form valid sentences. In a broad sense, a grammar can define a universe of vocabulary the system 210 expects at any given time in any given ASR mode. For example, if the system 210 is in a training mode for training commands, then the grammar model(s) 218 can include all commands known to and used by the system 210. In another example, if the system 210 is in a main menu mode, then the active grammar model(s) 218 can include all main menu commands expected by the system 210 such as call, dial, exit, delete, directory, or the like. Second, acoustic model(s) 220 assist with selection of most likely subwords or words corresponding to input from the pre-processor module 212. Third, word model(s) 222 and sentence/language model(s) 224 provide rules, syntax, and/or semantics in placing the selected subwords or words into word or sentence context. Also, the sentence/language model(s) 224 can define a universe of sentences the system 210 expects at any given time in any given ASR mode, and/or can provide rules, etc., governing which sentences can logically follow other sentences to form valid extended speech.

According to an alternative exemplary embodiment, some or all of the ASR system 210 can be resident on, and processed using, computing equipment in a location remote from the vehicle 102 such as the call center 108. For example, grammar models, acoustic models, and the like can be stored in memory of one of the servers 148 and/or databases 150 in the call center 108 and communicated to the vehicle telematics unit 114 for in-vehicle speech processing. Similarly, speech recognition software can be processed using processors of one of the servers 148 in the call center 108. In other words, the ASR system 210 can be resident in the telematics system 114 or distributed across the call center 108 and the vehicle 102 in any desired manner.

First, acoustic data is extracted from human speech wherein a vehicle occupant speaks into the microphone 132, which converts the utterances into electrical signals and communicates such signals to the acoustic interface 133. A sound-responsive element in the microphone 132 captures the occupant's speech utterances as variations in air pressure and converts the utterances into corresponding variations of analog electrical signals such as direct current or voltage. The acoustic interface 133 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 133 converts the analog electrical signals into digital electronic signals. The digital data are binary bits which are buffered in the telematics memory 122 and then processed by the telematics processor 116 or can be processed as they are initially received by the processor 116 in real-time.

Second, the pre-processor module 212 transforms the continuous stream of digital speech data into discrete sequences of acoustic parameters. More specifically, the processor 116 executes the pre-processor module 212 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module 214 to process the incoming feature vectors of each test pattern. The decoder module 214 is also known as a recognition engine or classifier, and uses stored known reference patterns of speech. Like the test patterns, the reference patterns are defined as a concatenation of related acoustic frames and corresponding parameters. The decoder module 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest. To identify words, individual HMMs for a sequence of subwords can be concatenated to establish word HMMs.

The speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of a word or subword and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Exemplary parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Finally, the post-processor software module 216 receives the output data from the decoder module 214 for any suitable purpose. For example, the post-processor module 216 can be used to convert acoustic data into text or digits for use with other aspects of the ASR system or other vehicle systems. In another example, the post-processor module 216 can be used to provide training feedback to the decoder 214 or pre-processor 212. More specifically, the post-processor 216 can be used to train acoustic models for the decoder module 214, or to train adaptation parameters for the pre-processor module 212.

Sampling-Rate-Independent Speech Recognition Method

A sampling-rate-independent method of automated speech recognition is provided herein and can be carried out as one or more computer programs using the architecture of the ASR system 210 within the operating environment of the telematics system 100 described above. Those skilled in the art will also recognize that the method can be carried out using other ASR systems within other operating environments.

The method is provided to improve speech recognition performance by overcoming an inherent mismatch between sampling rates of speech-containing audio and speech decoders and/or acoustic models used to recognize the speech-containing audio. In general, speech energies of a plurality of codebooks generated from training data created at an ASR sampling rate are compared to speech energies in a current frame of acoustic data generated from received audio created at an audio sampling rate below the ASR sampling rate. From the plurality of codebooks, a codebook is selected that has speech energies that correspond to speech energies in the current frame over a spectral range corresponding to the audio sampling rate. Speech energies above the spectral range are copied from the selected codebook, and the copied speech energies are appended to the current frame. Accordingly, speech recognition performance may be increased by such an improvement because it can append missing high frequency speech energies to low frequency audio for greater discrimination of high frequency fricative speech in the audio.

Figure 3:
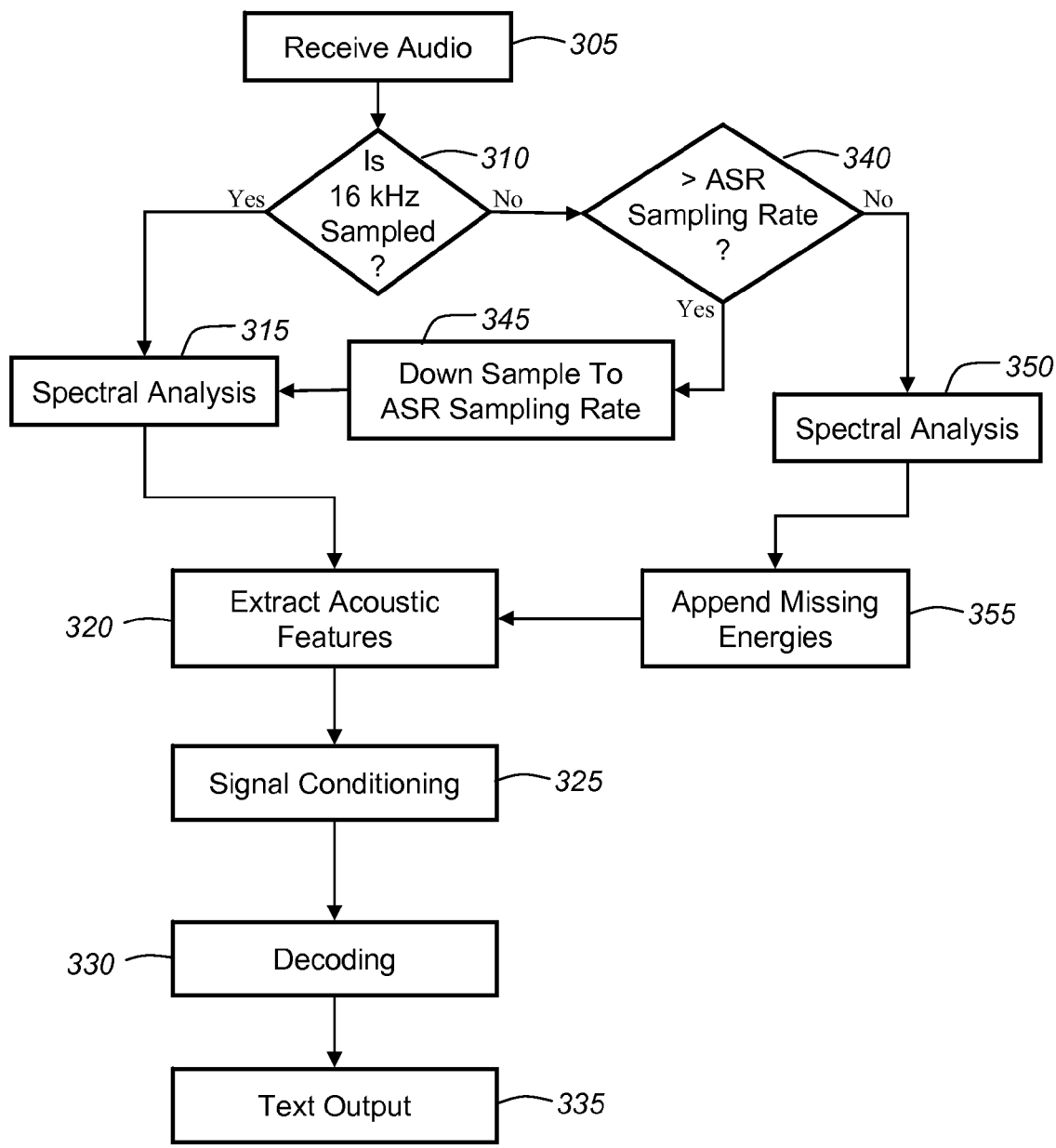
FIG. 3 is a flow chart of an embodiment of an exemplary sampling rate independent speech recognition method, which can be carried out using the telematics system and ASR architecture of FIGS. 1 and 2.

FIG. 3 illustrates an exemplary method of sampling rate independent speech recognition 300, as discussed in detail below.

At step 305, speech-containing audio created according to an audio sampling rate is received and acoustic data extracted therefrom. The speech-containing audio can be created by analog recording and subsequent digital conversion, digital generating, or the like. For example, speech-containing audio can be received by the ASR system 210 by a third party source of audio in communication with a receive path of the ASR system 210. For example, a third party source of audio can include a voicemail system, telephonic banking system, or any other conceivable telephonic services system. Such received audio may have been created at a lesser, greater, or equal sampling rate compared to an ASR sampling rate and, for example, the ASR can monitor the incoming digital stream entering the Codec. As described previously with respect to FIG. 2, the received speech-containing audio can be segmented into overlapping frames of acoustic data.

At step 310, a sampling rate is determined at which the received speech-containing audio was recorded or generated. For example, the ASR system 210 can determine if the audio received in step 305 was recorded at an ASR sampling rate, including but not limited to a sampling rate at which ASR training data was recorded and/or according to which acoustic models or decoders of an ASR system were built. If so, the method proceeds to steps 315 through 335 as will be briefly described immediately below and, otherwise, the method proceeds to steps 340 through 335 as will be described thereafter. The sampling rate can be embedded within an incoming data file. For example, a .wav file includes a header that contains, as a data field, the sampling frequency, which can be represented in little endian format.

At step 315, received speech-containing audio is spectrally analyzed to generate speech energies spanning a spectral range that corresponds to the audio sampling rate. For example, the audio received in step 305 can be filtered with a Mel filter to generate Mel filter speech energies on a frame-by-frame basis. As one of many examples, the spectral range can be 0-4 kHz and the audio sampling rate can be 8 kHz. Spectral analysis of received audio is well known to those of ordinary skill in the art, and any suitable technique(s) can be used.

At step 320, acoustic features are extracted from received audio. For example, Mel-frequency cepstral coefficients (MFCCs) can be extracted from the spectrally analyzed audio from step 315. Those of ordinary skill in the art will recognize that any suitable technique(s) can be used to extract acoustic features or feature vectors such as MFCCs or the like.

At step 325, received audio is signal conditioned. For example, signal conditioning can be performed on the MFCC output from step 320 and can include channel normalization, inclusion of dynamic features, noise removal, or the like. Those of ordinary skill in the art will recognize that any suitable signal conditioning technique(s) can be used.

At step 330, speech decoding is carried out. For example, the decoder 214 of the ASR system 210 can receive the signal conditioned acoustic features from step 325 to decode the speech represented thereby. The decoder 214 can use any suitable grammar and acoustic models. For example, acoustic models generated or adapted for an ASR sampling rate, such as a 16 kHz sampling rate, can be used, as will be described further herein below with respect to FIG. 6. At step 335, text may be output. For example, the post-processor module 216 can be used to convert acoustic data into text for use with other aspects of the ASR system or other systems.

At step 340, it is determined whether or not received audio was generated at a greater sampling rate than an ASR sampling rate. For example, the ASR system 210 can determine if the received audio is at the same sampling rate used to create or record the acoustic models or training data, such as a 16 kHz sampling rate. If so, then the method proceeds to step 345 and, otherwise, the method proceeds to step 350.

At step 345, received audio is downsampled to an ASR sampling rate. For example, incoming audio generated according to a 32 kHz sampling rate can be filtered down to a 16 kHz sampling rate. More specifically, every other sample of the 32 kHz audio can be removed to yield the desired 16 kHz audio. Those of ordinary skill in the art will recognize that the audio can be downsampled in any suitable manner, and from any sampling rate such as 32 kHz, 44.1 kHz, 48 kHz, 96 kHz, or the like. After step 345, the method proceeds to steps 315 through 335 as described previously.

At step 350, received audio is spectrally analyzed. For example, the audio received in step 305 can be filtered to generate Mel filter energies on a frame-by-frame basis. More particularly, the exemplary Mel filter of FIG. 3A can be used. In one example, where incoming audio was sampled at 8 kHz, that audio will include speech energies spanning a 0 to 4 kHz spectral range, but will not include any speech energies spanning a 4 to 8 kHz spectral range. Accordingly, application of the Mel filter of FIG. 3A will yield non-zero values for filter frequency bands 1 through 30, and will yield zero values for filter frequency bands 31 through 40.

At step 355, estimated speech energies above a predetermined spectral range can be appended or spliced to a frame of incoming audio. For example, missing speech energies in received audio can be estimated using codebooks generated in an exemplary method described below with respect to FIG. 4, and can be appended using another exemplary method set forth below with respect to FIG. 5.

According to the method 300, audio samples at any sampling rate are recognized, only one set of acoustic models is required, and embedded ASR and telephone and Bluetooth enabled speech applications can be enabled. Currently Bluetooth supports relatively narrow-band audio (8 kHz sampling rate), and the telephone system (narrow-band) uses Mu-law in North-America and A-law in Europe as an encoding method.

Figure 4:
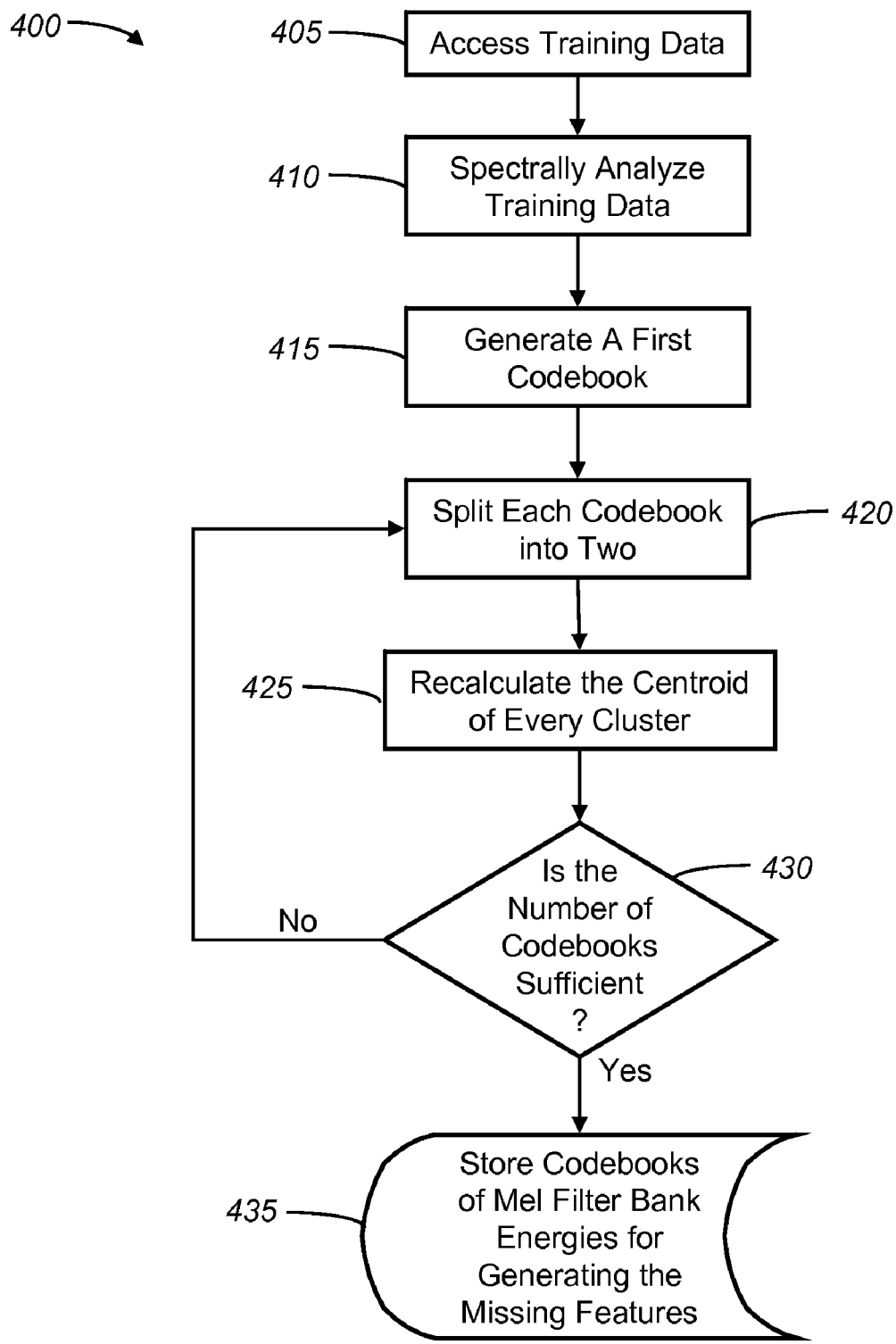
FIG. 4 is a flow chart of an embodiment of an exemplary method of generating codebooks used to estimate missing speech energies in received audio, which method can be carried out in conjunction with the method exemplified by FIG. 3 and using the telematics system and ASR architecture of FIGS. 1 and 2.

FIG. 4 illustrates an exemplary method of generating codebooks used to estimate missing speech energies in received audio 400.

At step 405, training data created according to an ASR sampling rate is accessed. For example, all training data stored in memory of the ASR system 210 can be retrieved, or just some portion thereof. Such training data can be generated or recorded according to any sampling rate, such as a sampling rate according to which a speech decoder and/or acoustic model(s) is designed or based. More specifically, typical ASR systems for automobiles include speech decoders and acoustic models based on a 16 kHz sampling rate. The training data can include speaker-dependent training data, speaker-independent training data, a Lombard corpus, or the like. The training data can be generated to include different types of users, speaking conditions, speech type, and the like. More specifically, the training data can be generated from users of different ages, gender, speaking rate, accent, and the like. Also, the training data can be generated from different speaking conditions such as automobile at rest, automobile highway driving, with background audio, and the like. Further, the training data can be generated from keyword or command speech, digit speech, and the like.

At step 410, training data is spectrally analyzed. For example, the training data accessed in step 405 can be filtered to generate Mel filter energies on a frame-by-frame basis. More particularly, FIG. 3A illustrates an exemplary Mel filter including filter frequency bands including center, lower cutoff, and upper cutoff frequencies. The Mel filter can be sized to correspond to the sampling rate and spectral range of the training data. For example, to correspond to the 16 kHz sampling rate of the training data, the Mel filter can range from about 31.25 Hz to about 8 kHz, and can be divided into 40 overlapping filter frequency bands. However, the Mel filter can be divided into any suitable quantity of filter frequency bands. Also, spectral analysis of training data is well known to those of ordinary skill in the art, and any suitable technique(s) can be used.

At step 415, a first codebook of training data created according to an ASR sampling rate is generated. For example, the codebook can be generated from the Mel filter energies generated in step 410, then can be generated for all of the frames and then iteratively bifurcated and represented as a binary tree. Those of ordinary skill in the art will recognize that a codebook can be a type of vector representative of Mel filter energies, and can be created by applying any suitable vector quantization techniques.

At step 420, one or more codebooks are split. For example, the first codebook generated in step 415 can be split into two individual codebooks. In another example, multiple (N) codebooks can be split into a greater multiple (e.g. 2N, 3N, etc.) codebooks. Those of ordinary skill in the art will recognize that any suitable codebook splitting technique(s) can be used.

At step 425, centroids are calculated or recalculated for clusters in codebooks. For example, prior to step 420 the codebook(s) include clusters and centroids of those clusters. After the codebook(s) is/are split in step 420, the centroids for clusters of those codebooks are recalculated. Those of ordinary skill in the art will recognize that any suitable centroid calculation or recalculation technique(s) can be used. As an example, a codebook can be considered an average of a set of frames, and a cluster can be considered a set of samples or frames that fall near a codebook.

At step 430, it is determined whether or not a desired quantity of split codebooks has been generated. For example, the quantity of codebooks can be constrained by computing resources, and an exemplary quantity of codebooks can range from 64 to 1,024 codebooks. 128 codebooks can be a typical minimum number, but there can be more or less codebooks depending on system resources. The more resources, such as memory and computational power, the more codebooks that can be used. If it is determined that the desired quantity has not been reached, then the method loops back to step 420 to continue splitting codebooks. Otherwise, the method proceeds to step 435.

At step 435, codebooks of training data at an ASR sampling rate are stored for later access. For example, the codebooks generated and refined in steps 420 and 425 can be stored for future use in supplying missing features of audio data sampled at a lower rate compared to the ASR sampling rate of the training data, as will be discussed further herein below.

According to another embodiment, multiple sets of codebooks can be generated and stored such as corresponding to different vehicle conditions. More specifically, sets of codebooks can be generated by vehicle condition, including vehicle type, city and highway driving, idling, different fan settings, and the like. The different sets of codebooks can be retrieved by the ASR system for speech recognition carried out in real-time conditions, which correspond to the condition(s) used to generate the codebooks.

Figure 5:
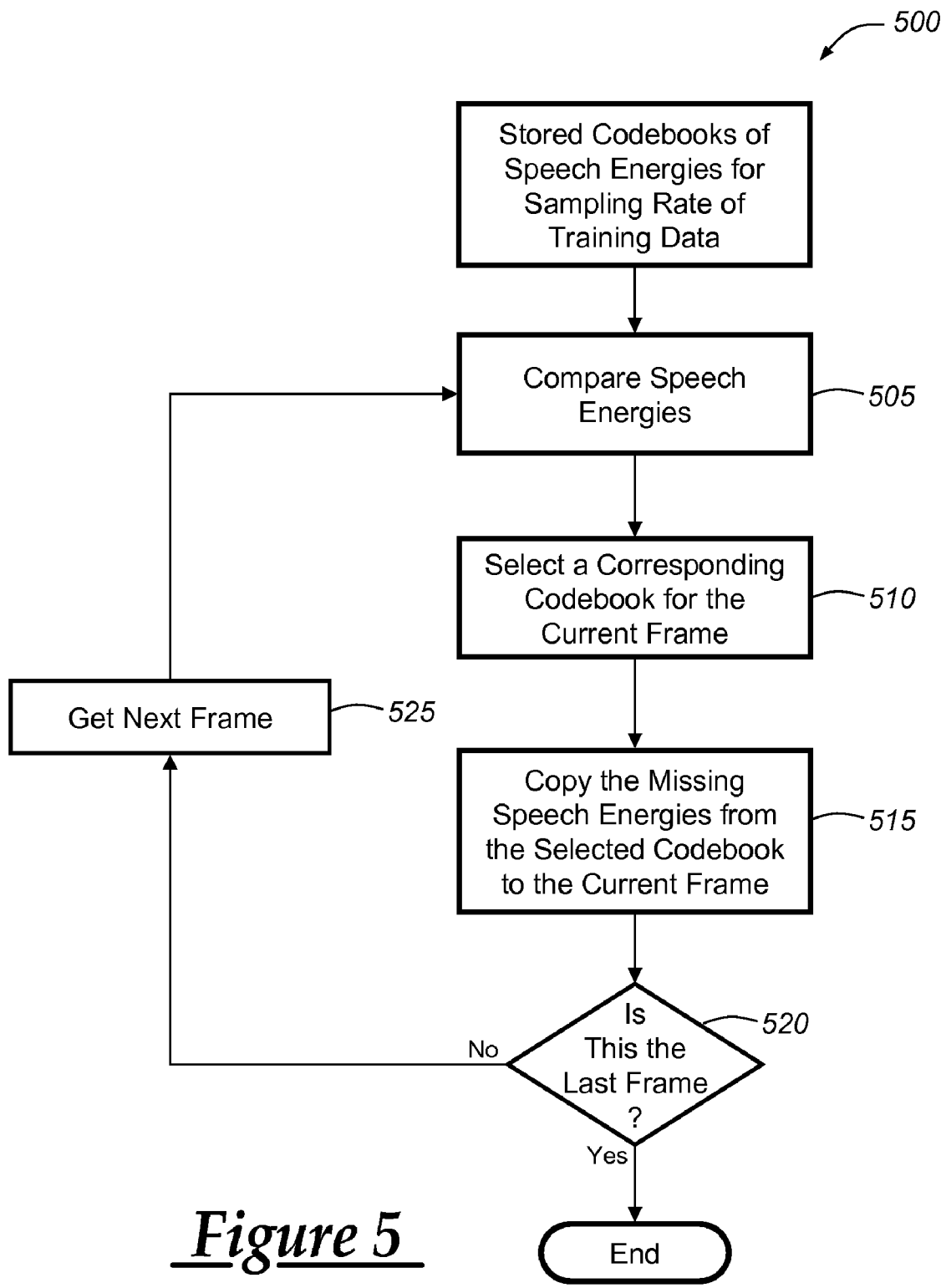
FIG. 5 is a flow chart of an embodiment of an exemplary method of appending speech energies, which method can be carried out in conjunction with the method exemplified by FIG. 3 and using the telematics system and ASR architecture of FIGS. 1 and 2.

FIG. 5 illustrates an exemplary method of appending speech energies 500.

At step 505, speech energies for a frame of speech-containing audio created at an audio sampling rate are compared to speech energies of stored codebooks of training data created at an ASR sampling rate. For example, the codebooks stored in step 435 of method 400 can be retrieved or accessed from memory. In one embodiment, a set of the codebooks generated according to certain vehicle conditions that correspond to present vehicle conditions can be retrieved. In any case, upon retrieval, speech energies for a frame of 8 kHz audio such as from step 350 are compared to energies of 16 kHz training data such as from method 400. More specifically, speech energies from filter frequency bands 1 through 30 of FIG. 3A can be compared to speech energies of the frame of 8 kHz incoming audio.

At step 510, a codebook is selected that has speech energies that correspond to speech energies in a current frame over a spectral range that corresponds to an audio sampling rate. For example, the codebook from the stored codebooks of method 400 having Mel filter energies that best correspond to Mel filter energies of the incoming audio of step 355 can be selected. More specifically, the codebook having energies in filter frequency bands 1 through 30 that most closely correspond to the energies of the incoming 8 kHz audio can be selected. Those of ordinary skill in the art will recognize that any suitable codebook selection technique(s) can be used. For example, the best corresponding codebook can be selected based on any suitable calculations such as minimum Euclidean distance, Mahalanobis distance, or the like. As a specific example, if a frame is compared to three codebooks, CB1, CB2 and CB3, and the distance (Euclidian or other) is 0.28, 0.14, and 0.20 respectively, then CB2 can be selected.

At step 515, speech energies above a spectral range of incoming audio are copied from a selected codebook generated from training data, and are appended or spliced to a current frame of the received or incoming audio. For example, and referring to FIG. 3A, in a current frame of incoming audio sampled at 8 kHz, energies corresponding to filter bands 31 through 40 are copied from the selected codebook and appended to the current frame. In other words, Mel filter energies from training data at a given sampling rate can be used as a proxy for corresponding Mel filter energies missing from incoming audio created according to a lower sampling rate.

At step 520, it is determined whether a current frame of incoming audio is a last of several frames to be appended with missing Mel filter energies. If so, the method ends. Otherwise, another frame is retrieved at step 525, and the method loops from step 505 through 515.

Figure 6:
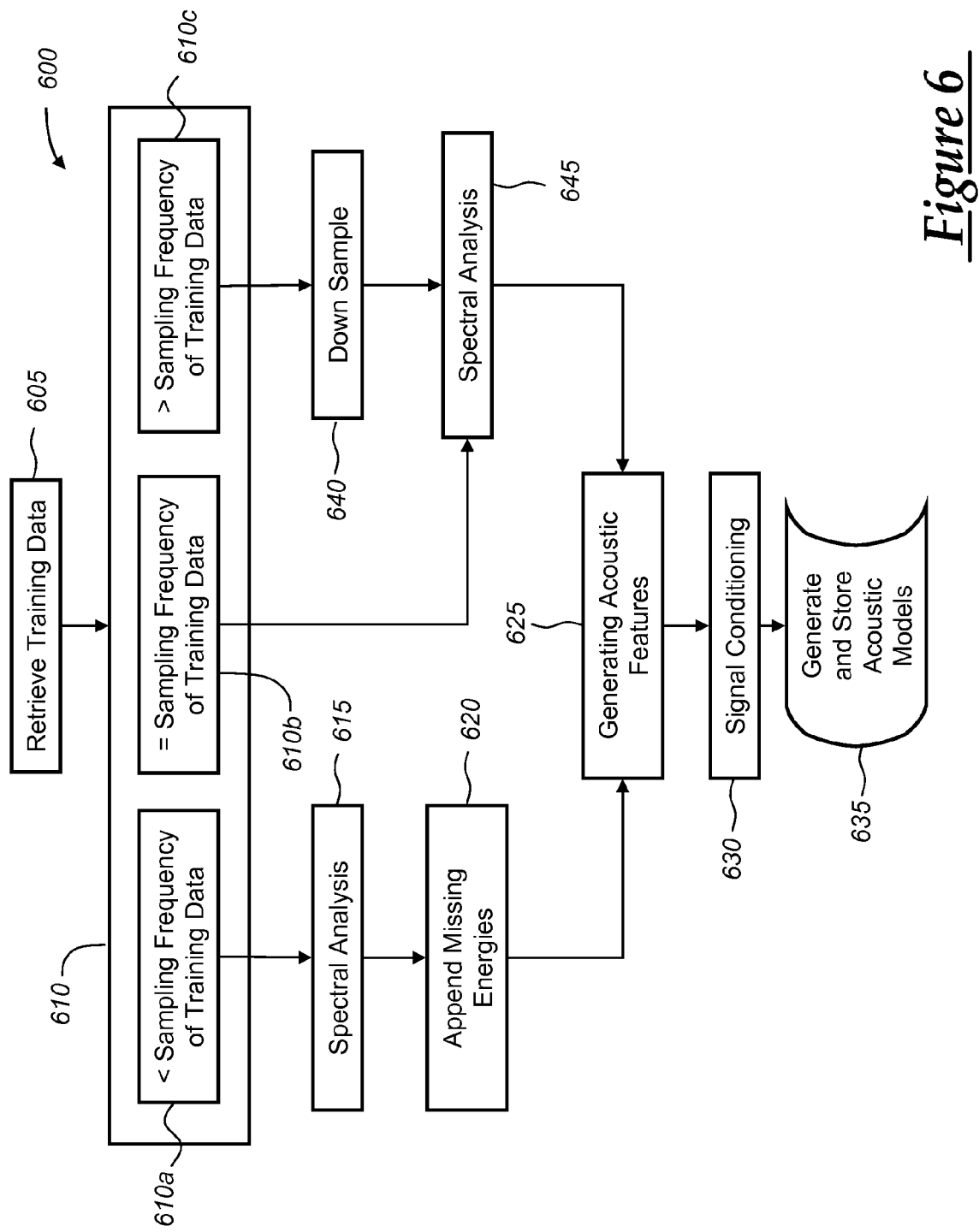
FIG. 6 is a flow chart of an embodiment of an exemplary method of building acoustic models with estimated Mel filter speech energies, which method can be carried out in conjunction with the method exemplified by FIG. 3 and using the telematics system and ASR architecture of FIGS. 1 and 2.

FIG. 6 illustrates a method 600 of building acoustic models with estimated Mel filter speech energies. In general, this method 600 can be used to supplement the general sampling rate independent speech recognition method 300 of FIG. 3. More specifically, this method 600 can be used to build acoustic models for use in the decoding step 330 of the FIG. 3 method 300.

At step 605, training data generated according to one or more different sampling rates are accessed. For example, all training data stored in memory of the ASR system 210 can be retrieved, or just some portion thereof. Such training data can be generated according to any ASR sampling rate, such as 16 kHz.

At step 610, a sampling rate of training data is determined in any suitable manner. For example, the sampling rate of training data received in step 605 can be determined as described above with respect to the method 300 exemplified by FIG. 3.

At step 615, training data sampled at a rate lower than an ASR sampling rate are spectrally analyzed. For example, and akin to step 350, the training data received in step 605 can be filtered to generate Mel filter energies on a frame-by-frame basis. The training data can be classified in any suitable manner by sampling rate, such as less than an ASR sampling rate (610a), equal to an ASR sampling rate (610b), and/or greater than an ASR sampling rate (610c).

At step 620, estimated speech energies above a predetermined frequency are appended to a frame of training data speech. For example, missing speech energies in audio can be estimated using the codebooks generated in method 400 described above, and the exemplary speech energies appending method 500 exemplified by FIG. 5 can be used.

At step 625, acoustic features are extracted from training data. For example, and akin to step 320, Mel-frequency cepstral coefficients (MFCCs) can be calculated from the appended Mel filter energies from step 620.

At step 630, received audio is signal conditioned in any suitable manner, such as previously disclosed with respect to step 325.

At step 635, acoustic models are generated and stored in any suitable manner. For example, acoustic models can be generated by maximum likelihood estimation (Baum-Welch), minimum classification error (discriminative training), or other suitable techniques.

At step 640, received audio is downsampled to an ASR sampling rate, for example, as described with respect to step 345 of method 300.

At step 645, received speech-containing audio is spectrally analyzed, for example, as described with respect to step 315 of method 300.

In another embodiment, the codebook splicing technique described above could be applied in other domains such as the spectral domain. For example, if 256 samples are taken in the time domain, this data can then be subjected to a Fast Fourier Transform (FFT) for transformation into the spectral domain. Then, once converted, the data can be passed to banks of a Mel filter, and then into a codebook. The 256 samples could have been placed in the codebook instead of running them through the Mel filter. In any case, once the data is converted from the time to spectral domain, the resulting values can be placed in a codebook. In such a case, the computational costs would be relatively higher because of higher dimensionality, but accuracy could be improved.

The methods 300, 400, 500, 600 described above may be carried out as a computer program or instructions thereof storable on a computer-readable medium, and executable by an automated speech recognition (ASR) system to cause the ASR system to perform the method(s).

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A sampling-rate-independent method of automated speech recognition (ASR), comprising the steps of:
   comparing speech energies of a plurality of codebooks generated from training data created at an ASR sampling rate to speech energies in a current frame of acoustic data generated from received audio from which speech is to be recognized and that was created at an audio sampling rate below the ASR sampling rate, wherein the comparing step is carried out using a processor;
   selecting from the plurality of codebooks, a codebook having speech energies that correspond to speech energies in the current frame over a spectral range corresponding to the audio sampling rate;
   copying from the selected codebook, speech energies above the spectral range;
   appending the copied speech energies to the current frame;
   extracting acoustic features from the appended current frame; and
   decoding the extracted acoustic features to recognize the speech.

2. The method set forth in claim 1, wherein the plurality of codebooks are provided from a plurality of sets of codebooks wherein each set was generated according to a certain vehicle condition.

3. The method set forth in claim 2, wherein the plurality of codebooks are retrieved for speech recognition carried out in a current vehicle condition that corresponds to the vehicle condition used to generate the plurality of codebooks.

4. An automated speech recognition (ASR) system, comprising:
   at least one input device to receive incoming audio;
   a memory storing program instructions and data; and
   a processor coupled to the input device(s) and memory, and responsive to the program instructions for causing the ASR system to perform a method according to claim 1.

5. A computer-readable medium comprising instructions executable by an automated speech recognition (ASR) system to cause the ASR system to perform a method according to claim 1.

6. A sampling-rate-independent method of automated speech recognition (ASR) of speech-containing audio, comprising the steps of:
 accessing a plurality of codebooks generated from training data created at an ASR sampling rate;
 receiving speech-containing audio from which speech is to be recognized and that was created according to an audio sampling rate below the ASR sampling rate;
 segmenting the received speech-containing audio into overlapping frames of acoustic data;
 spectrally analyzing the acoustic data to generate speech energies spanning a predetermined spectral range corresponding to the audio sampling rate;
 comparing speech energies of the plurality of codebooks to speech energies in a current frame of the acoustic data, wherein the comparing step is carried out using a processor;
 selecting from the plurality of codebooks a codebook having speech energies that correspond to speech energies in the current frame over a spectral range corresponding to the audio sampling rate;
 copying from the selected codebook speech energies above the spectral range; and
 appending the copied speech energies to the current frame;
 extracting acoustic features from the appended current frame; and
 decoding the extracted acoustic features to recognize the speech.

7. The method set forth in claim 6, wherein the acoustic data is spectrally analyzed using a Mel filter including a plurality of filter banks to generate Mel filter speech energies spanning the spectral range corresponding to the audio sampling rate.

8. The method set forth in claim 6, wherein the plurality of codebooks are provided from a plurality of sets of codebooks wherein each set was generated according to a certain vehicle condition.

9. The method set forth in claim 8, wherein the plurality of codebooks are retrieved for speech recognition carried out in a current vehicle condition that corresponds to the vehicle condition used to generate the plurality of codebooks.

10. A sampling-rate-independent method of automated speech recognition (ASR), comprising the steps of:
 (a) accessing a plurality of codebooks generated from training data created at an ASR sampling rate;
 (b) receiving speech-containing audio created according to an audio sampling rate;
 (c) segmenting the speech-containing audio into overlapping frames of acoustic data;
 (d) determining whether the audio sampling rate is greater than the ASR sampling rate and, if so, then down sampling the received audio and skipping to steps (l)-(m);
 (e) determining whether the audio sampling rate is the same as the ASR sampling rate and, if so, then skipping to steps (l)-(m);
 (f) determining whether the audio sampling rate is less than the ASR sampling rate and, if so, then proceeding to steps (g)-(m);
 (g) spectrally analyzing the acoustic data using a Mel filter including a plurality of filter banks to generate Mel filter speech energies spanning a spectral range corresponding to the audio sampling rate;
 (h) comparing speech energies of the plurality of codebooks to speech energies in a current frame of the acoustic data, wherein the comparing step is carried out using a processor;
 (i) selecting from the plurality of codebooks, a codebook having speech energies that correspond to speech energies in the current frame over a spectral range corresponding to the audio sampling rate;
 (j) copying from the selected codebook, speech energies above the spectral range;
 (k) appending the copied speech energies to the current frame;
 (l) extracting acoustic features from the appended current frame; and
 (m) decoding the extracted acoustic features.

* * * * *